United States Patent

Voight et al.

[11] Patent Number: 5,555,671
[45] Date of Patent: Sep. 17, 1996

[54] LIGHT WEIGHT FLY BOX

[75] Inventors: Bradford Voight, 315 West St., Needham Heights, Mass. 02194; Mark Wentworth, Wilmot; Luke P. Janetos, Rollinsford, both of N.H.

[73] Assignee: Bradford Voight, Needham, Mass.

[21] Appl. No.: 349,202

[22] Filed: Dec. 5, 1994

[51] Int. Cl.$^6$ .................................. A01K 97/06
[52] U.S. Cl. .................. 43/57.1; 43/54.1; 206/315.11; 206/523
[58] Field of Search ................... 43/57.1, 54.1; 206/315.11, 317, 523, 524

[56] References Cited

U.S. PATENT DOCUMENTS

| | | | |
|---|---|---|---|
| 3,163,289 | 12/1964 | Laffkas et al. | 206/523 |
| 3,181,693 | 5/1965 | Freistat | 206/523 |
| 3,251,638 | 5/1966 | Schwartz | 43/57.1 X |
| 3,346,313 | 10/1967 | Fee | 43/57.1 X |
| 3,461,599 | 8/1969 | Sylvester | 43/57.1 |
| 3,777,882 | 12/1973 | McIntyre | 206/523 |
| 3,780,468 | 12/1973 | Maffett | 43/54.1 |
| 3,889,805 | 6/1975 | Korten | 43/54.1 X |
| 4,106,597 | 8/1978 | Shook et al. | 206/523 |
| 4,186,511 | 2/1980 | Slacter | 43/57.1 |
| 4,240,222 | 12/1980 | Covington | 43/57.1 |
| 4,243,140 | 1/1981 | Thrun | 206/523 |
| 4,386,702 | 6/1983 | Schultz et al. | 206/523 |
| 4,829,699 | 5/1989 | Perkins | 43/57.1 |
| 5,414,953 | 5/1995 | Taylor | 43/54.1 |

Primary Examiner—Jack W. Lavinder
Assistant Examiner—Jay A. Stelacone
Attorney, Agent, or Firm—Brian M. Dingman

[57] ABSTRACT

A light weight fly box for holding fishing flies made entirely from foamed plastic material, with the outside of the box made from a more-dense material to provide durability and structural integrity, and a less-dense material used on the inside of the box so that central depressed areas may be relatively easily thermoformed in the box to provide the volume necessary for holding flies.

13 Claims, 3 Drawing Sheets

LIGHT WEIGHT FLY BOX

FIELD OF INVENTION

This invention relates to a light weight plastic fly box made from a foamed plastic material.

BACKGROUND OF INVENTION

Fly fisherman typically want to have dozens of flies at their disposal for use in a fishing expedition, so that different types of flies can be tried for their success. The flies are kept in fly boxes, which are relatively small, flat, hinged boxes with a closure. Fly fisherman commonly carry from four to eight of these boxes, each of which can hold up to $500.00 worth of flies. The boxes often have a ridged insert piece into which the hooks can be buried. The piece is designed so that the bodies of the flies can sit within the grooves of the piece in order to protect them from damage.

Fly fisherman often must walk some distance to access a stream or lake. Any extra weight carried by fisherman is thus an important consideration. Fly boxes in use today are typically made from a metal or hard plastic case with a soft plastic insert for holding the flies. These boxes weigh from three to five ounces each. Accordingly, a full complement of boxes can weigh anywhere from one to five pounds, which is substantial considering the distance any fly fisherman must walk, and the amount of time fisherman spend standing with the boxes on their person.

Additional important considerations for fly box design are the opening and closing of the box, and whether the boxes can float. It is important that the boxes are relatively easy to open, especially in cold weather use, when dexterity is a problem. In addition, as the boxes can hold hundreds of dollars worth of flies, if one is dropped and quickly sinks, there could be a substantial monetary loss, not to mention the loss of the use of the flies for the balance of the fishing trip. Yet another consideration is the life of the hinge. The hard plastic polystyrene boxes are typically of a unitary design, in which the hinge is a so called "living" hinge which is molded directly into the box. Polystyrene tends to fatigue with time, however, and so the hinge eventually begins to tear, necessitating replacement of the box. A final consideration is that the hard exteriors of these boxes does not allow flies, or the needles used for clearing the eyes of hooks, to be held temporarily on the outside of the box, which is desirable for quick access to at least a small number of flies, or the needle, in order to save time and effort.

SUMMARY OF THE INVENTION

It is therefore an object of this invention to provide a light weight fly box.

It is a further object of this invention to provide such a fly box which is unsinkable.

It is a further object of this invention to provide such a fly box which is extremely easy to open and close.

It is a further object of this invention to provide such a fly box which has a virtually indestructible hinge which cannot corrode.

It is a further object of this invention to provide such a fly box which is very inexpensive.

It is a further object of this invention to provide such a fly box in which sharp objects such as hooks and needles can be stuck into the outside of the box for easy access.

It is a further object of this invention to provide such a fly box which can be permanently marked during manufacturing with a custom marking.

This invention results from the realization that an extremely light weight, easy to use, floating fly box can be accomplished by thermoforming the box from a two-density foamed plastic material, in which the more dense material is arranged to comprise the outside of the box to provide toughness and durability, with the less-dense material forming the inside of the box into which the fly hooks can be buried.

This invention features a light-weight fly box for holding fishing flies. The box is preferably of a unitary construction, with a bottom member made from plastics of two densities, with the more dense plastic on the outside of the member, and the less dense plastic on the inside of the member. The top member is also made from plastics of two densities, with the more dense plastic on the outside of the member, and the less dense plastic on the inside of the member. The members are connected along an edge thereof by a hinge which allows the box to be opened and closed.

The box may alternatively be made from a single density, or triple density, foamed plastic material(s), preferably polyethylene.

In the preferred embodiment, the bottom member and top members are made of the same materials, which are foamed plastic such as polyethylene, polyurethane, or polystyrene foam. The preferred materials are six pound cross-linked polyethylene irradiated foam for the outside of the box, and four pound cross-linked polyethylene irradiated foam for the inside of the box. The foam materials may be laminated together in sheet form, and the box may be thermoformed from the sheet, to create the desired shape with a "living" hinge interconnecting the top and bottom members.

The box preferably has a closure means, which may be accomplished by including at least one magnet or magnetic material in the top member, and a meeting magnet or magnetic material in the bottom member, in which the two are arranged to meet when the box is closed, to hold the box edges close together by magnetic force. In the preferred embodiment, there are two small disk magnets embedded near the two corners of the top member, with the same arrangement on the bottom member.

BRIEF DESCRIPTION OF THE DRAWINGS

Other objects, features and advantages will occur to those skilled in the art from the following description of a preferred embodiment, and the accompanying drawings, in which.

DESCRIPTION OF THE PREFERRED EMBODIMENT

The light weight fly box of this invention, in the preferred embodiment, is thermoformed from a two-density foamed plastic sheet material. The sheet material is formed from two thinner sheets which are laminated together prior to thermoforming. The more-dense sheet forms the outside of the box to provide toughness, durability, and stability to the box, while the inside of the box is thermoformed from a less dense, softer material, which is easier to thermoform to the desired shape, and easier to penetrate with the fly hooks, yet has the durability to withstand repeated use. The preferred material, because of its availability, low cost, and durability, is a cross-linked polyethylene irradiated foam material, with a six pound density foam used for the outside, and a four pound density foam used for the inside. Alternatively, a single density foamed plastic material, or more than two densities of foamed plastic material, can be used to fabricate the box.

Figure 1:
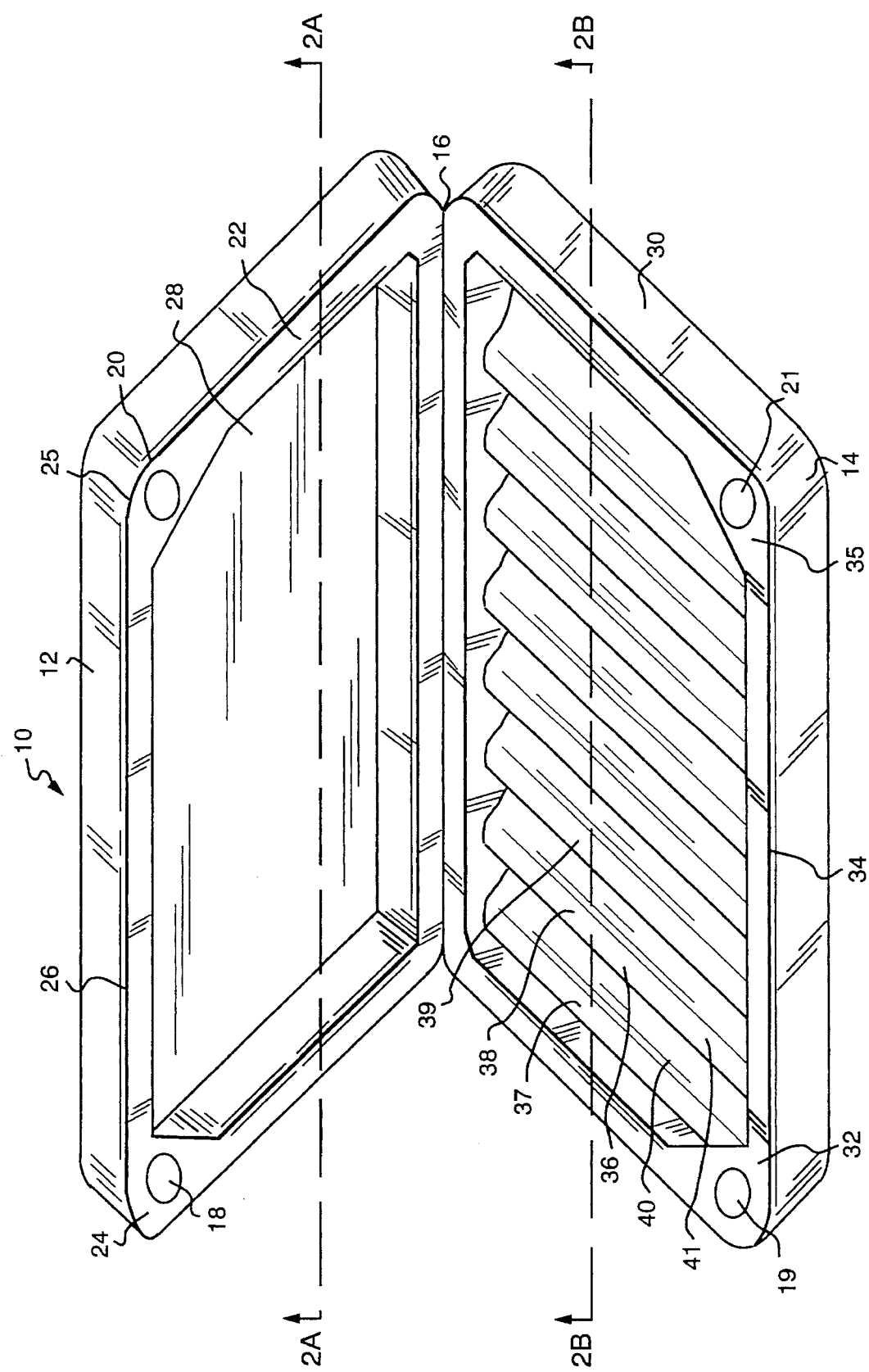
FIG. 1 is an axonometric view of a preferred embodiment of the fly box of this invention, partially open to show the interior construction.
Figure 3:
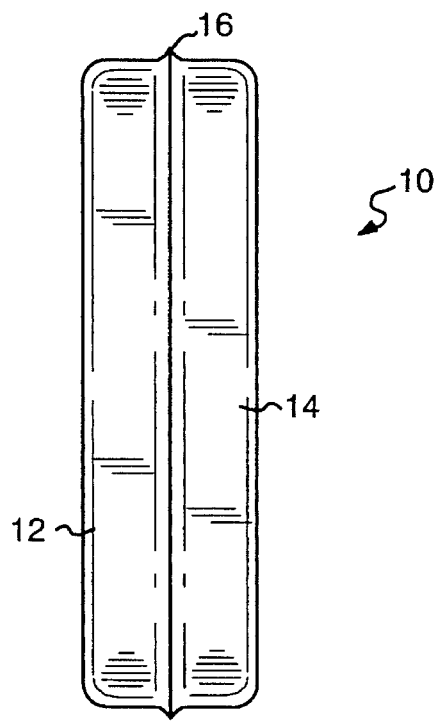
FIG. 3 is a rear elevational view of the box of FIG. 1 closed, showing the living hinge of the box.
Figure 2A:
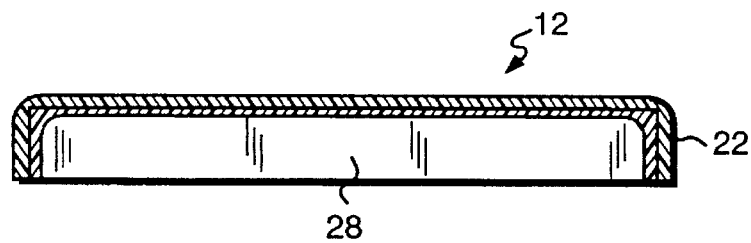
FIG. 2A is a cross sectional view taken along line A—A of FIG. 1, detailing the construction of the top section of the fly box of FIG. 1.
Figure 2B:
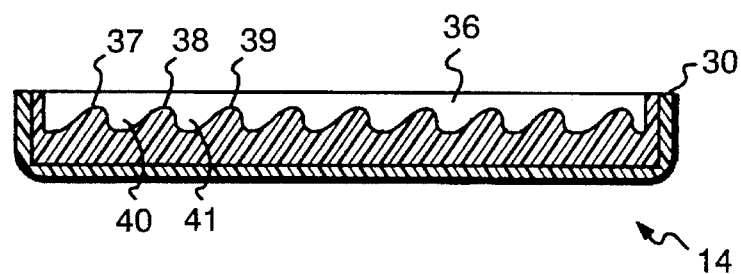
FIG. 2B is a cross section taken along line B—B of FIG. 1, detailing the construction of the bottom section of the fly box of FIG. 1.

There is shown in FIGS. 1 through 3 the preferred embodiment of light weight fly box 10 according to this invention. Fly box 10 includes top member 12 which is interconnected to bottom member 14 by hinge 16. Both members 12 and 14 are made from plastics of two densities, with the more dense plastic on the outside of each of the top and bottom member, and the less dense plastic on the inside of each of the top and bottom member, as further explained below in conjunction with FIGS. 4 through 6.

Top member 12 is a generally rectangular shape defined by rim portion 22 of generally constant thickness with the exception of enlarged front corners 24 and 25, which add structural stability to member 12, as well as providing a larger area of engagement with like portions 32 and 35 of bottom member 14. The means for releasably fastening top member 12 to bottom member 14 are preferably carried in those enlarged corner areas. In the preferred embodiment, this releasable box closure means is accomplished with disk magnets 18 and 20 which are arranged to meet matching disk magnets 19 and 21, respectively. Ceramic magnets such as sintered strontium or barium ferrite have been found to be relatively inexpensive magnets which will not corrode when wet, and which are capable of being glued into members 12 and 14 so that the tops of the magnets are flush with the top surface of the portion of the member in which they are embedded, in order to form a relatively tight closure at front edges 26 and 24.

Top member 12 has central depressed area 28 on its inside, to provide additional room for flies which are placed inside the box.

Bottom member 14 with rim portion 30 is essentially identical to top member 12, with the exception of central depressed area 36, which has a number of ridges and grooves of the type commonly found in fly boxes. For example, ridges 37 through 39 have defined therebetween grooves 40 and 41. This arrangement allows flies to be laid in the grooves, with their hooks embedded in the material from which central area 36 is made. The ridges extending above the grooves help to protect the flies from being crushed when the box is closed.

Box 10 is preferably fabricated entirely from a foamed plastic material, such as cross-linked polyethylene irradiated foam, although other plastic foamed materials, such as foamed polyurethane and foamed polystyrene, could alternatively be used. The interior portion of the box is made from a foamed plastic which is less dense than the foamed plastic from which the exterior of the box is made. This construction provides the more dense, rigid, and tough material on the outside of the box, in order to provide structural integrity and a long-lasting construction. The interior of the box is made from a less dense material which is easier to thermoform into the central areas of the top and bottom, and which also is easier to penetrate with hooks, so that the flies can be more easily held within the grooves in the bottom section.

The box of this invention is preferably made by laminating together sheets of foamed plastic with the desired densities, and then thermoforming the inside and outside box shapes into the laminated sheets, and die cutting the thermoformed shape from the sheet. The result is a unitary construction, with a "living" hinge interconnecting the top and bottom members. Hinge 16 is shown in FIG. 3 and interconnects top member 12 to bottom member 14.

Figure 4:
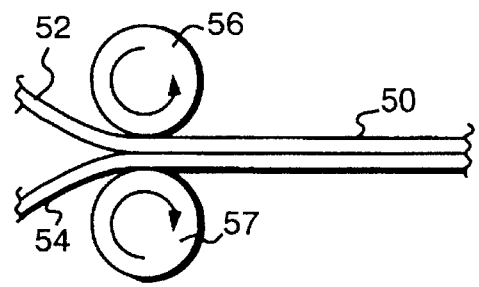
FIG. 4 is a schematic diagram of the preferred manner in which two sheets of foamed plastic material are laminated to make the plastic material from which the fly box of this invention is preferably formed.
Figure 5:
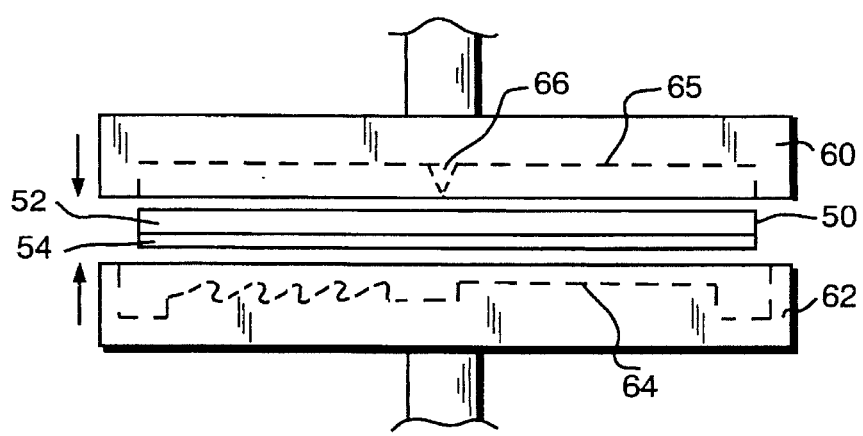
FIG. 5 is a simplified schematic diagram of the thermoforming of the laminated foamed plastic sheet of FIG. 4, which simultaneously forms the interior and exterior shape of the box of FIG. 1.
Figure 6:
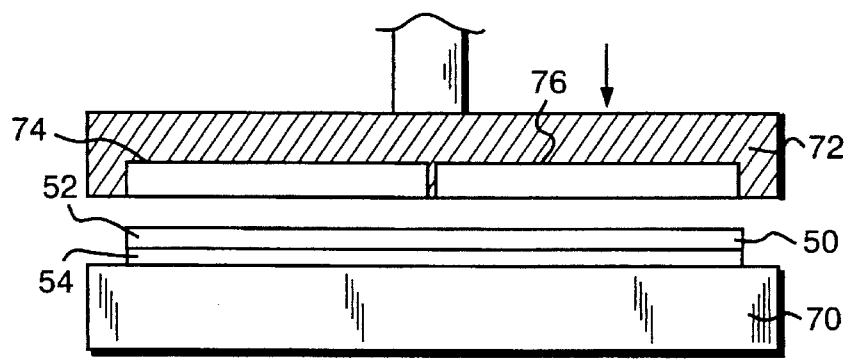
FIG. 6 is a simplified schematic diagram of the die cutting accomplished on the thermoformed sheet of FIG. 5, which cuts the individual boxes from the multiple-up thermoformed format of FIG. 5.

This preferred manner of fabricating the box of this invention is schematically depicted in FIGS. 4 through 6. Two-density laminated plastic sheet 50 is preferably made from first sheet 52 which eventually forms the exterior of the box. Sheet 52 may be a ⅛" thick sheet of six pound cross-linked polyethylene irradiated foam. Sheet 54, which eventually forms the inside of the box, is the same material, but is a ¼" thick sheet of four pound density foam. The sheets are laminated together using a hot roll laminator including heated rollers 56 and 57 which turn in the direction shown, and appl a desired pressure and temperature to sheets 52 and 54 to effect their lamination.

Sheet 50 is then thermoformed as shown in FIG. 5, to form the central depressed areas in the top and bottom, and the exterior shape along the edges, as well as the living hinge. The box is then die cut from the sheet.

The thermoforming of the interior of the box is schematically depicted in FIG. 5. Sheet 50 is laid between plates 60 and 62. Plate 62 is machined to form the desired shapes of the interior central areas of the top and bottom of the box, as shown by dashed line 64. The exterior of the box is thermoformed by machining 65 of plate 60, which includes central ridge 66 that forms the living hinge. Sheet 50 is laid between the plates so that layer 54, which forms the inside of the box, is down, against plate 62. The plates are then pressed together in the direction of the arrows to thermoform the interior and exterior box shape and features. Depending upon the size of the box, and the size of the thermoforming apparatus, there may be more than one box formed per sheet 50.

The boxes can be permanently marked during manufacture by machining plate 62 in a desired fashion to effect thermoforming of the marking in the box. For example, a product name, or manufacturer's name, could be embossed in the box top by correctly machining portion 64 of plate 62.

The thermoformed sheet 50 is then placed between flat plate 70 and machined die cutter plate 72 of a die cut apparatus. Top sheet 52 is placed face-up, so that it is contacted by the machined portion of die cutter plate 72. In this example, die cutter plate 72 is shown as cutting two boxes across its width, with depression 74 for one box, and depression 76 for the second box. The result is a unitary construction with a living hinge area which can be flexed innumerable times without fatiguing or cracking.

Magnets 18–21, FIG. 1, are fitted in depressions molded into the box, and glued in so that their upper surfaces are flush with the box surfaces. The depressions are prepared with a primer, and a glue such as #411 Lok-Tite glue is used to cement the magnets in place.

Other means of releasably holding the box closed are contemplated herein, for example hook and loop fasteners in place of magnets, or a two-piece strap fixed to the top and bottom member which meets when closed and can be fastened together, such as by using a hook and loop fastener or a snap, for example. It has been found that the magnet closure means described are a positive-closing, easily releasable closure means which is ideally suited to maintaining the edges of the box together so that it is rigid and more waterproof, yet easy to separate with one hand, and therefore easier to use, especially in cold weather when dexterity is more of a problem.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A unitary light-weight fly box for holding fishing flies, comprising:
   a bottom member made from two foamed plastic layers of different densities and fixed to one another, with the more dense foamed plastic on the outside of said bottom member, and the less dense foamed plastic on the inside of said bottom member;
   a top member made from said two foamed plastic layers of different densities and fixed to one another, with said more dense foamed plastic on the outside of said top member, and said less dense foamed plastic on the inside of said top member; and
   a living hinge interconnecting said top and bottom members along a first edge of each said member said living hinge also made from said two foamed plastic layers of different densities, to allow the box to be opened and closed.

2. The light-weight fly box of claim 1 in which both said foamed plastics are polyethylene foam.

3. The light-weight fly box of claim 2 in which said more dense plastic is six pound polyethylene foam.

4. The light-weight fly box of claim 2 in which said less dense plastic is four pound polyethylene foam.

5. The light-weight fly box of claim 2 in which said polyethylene foam is cross-linked polyethylene irradiated foam.

6. The light-weight fly box of claim 1 in which said more dense and less dense foamed plastics are laminated together.

7. The light-weight fly box of claim 6 in which said box is at least partially thermoformed from said laminated plastics.

8. The light-weight fly box of claim 1 further including resealable box closure means for holding said top and bottom members close together when the box is closed.

9. The light-weight fly box of claim 8 wherein said top and bottom members meet along a second edge of each said member, in which said box closure means includes mating closure members on said top and bottom members.

10. The light-weight fly box of claim 9 in which said closure members include magnets in said top and bottom sections that meet when the box is closed.

11. The light-weight fly box of claim 10 in which said magnets are proximate said second edge of each said member.

12. The light-weight fly box of claim 11 wherein said top member and said bottom member are each generally rectangular, in which said magnets are proximate corners of said top member and said bottom member.

13. A unitary, light-weight, plastic fly box for holding fishing flies, comprising:
   a unitary structure including:
      a bottom member made from a dense foamed plastic on the outside of the bottom member, and a less dense foamed plastic on the inside of the bottom member, in which the plastics are laminated together;
      a top member made from said dense foamed plastic on the outside of the top member, and said less dense foamed plastic on the inside of the top member, in which the plastics are laminated together;
      a living hinge interconnecting said top and bottom members along a first elongated edge of each said member, to allow the box to be opened and closed; and
      box closure means including magnetic material embedded in the top member, and magnetic material embedded in the bottom member, and disposed to meet when the members are closed together to hold the top and bottom members close together with a releasable box closure.

* * * * *